E. ULLRICH & E. A. ALCAYDE.
NUT BREAKING MACHINE.
APPLICATION FILED JUNE 9, 1916.
1,232,409.
Patented July 3, 1917.
2 SHEETS—SHEET 1.
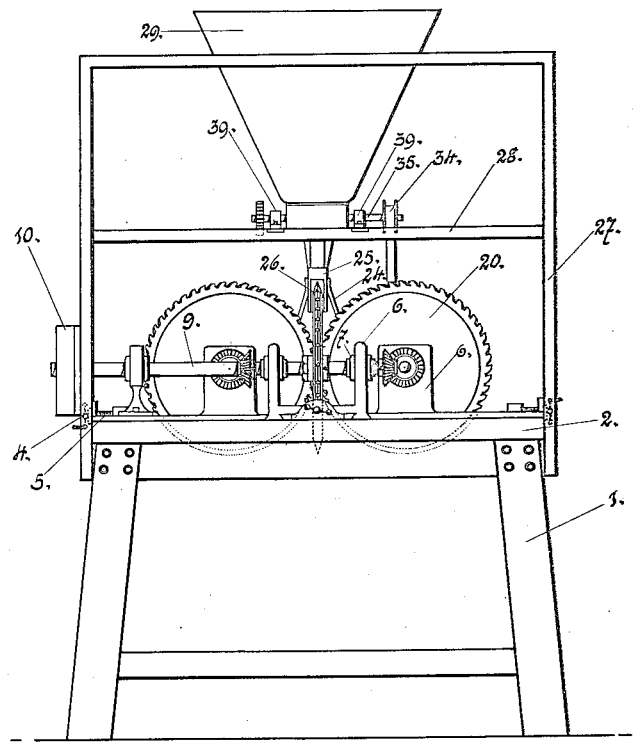
Inventors:
Edmund Ullrich and
Emilio Alcayde Alcayde,
By: B. Singer Atty.

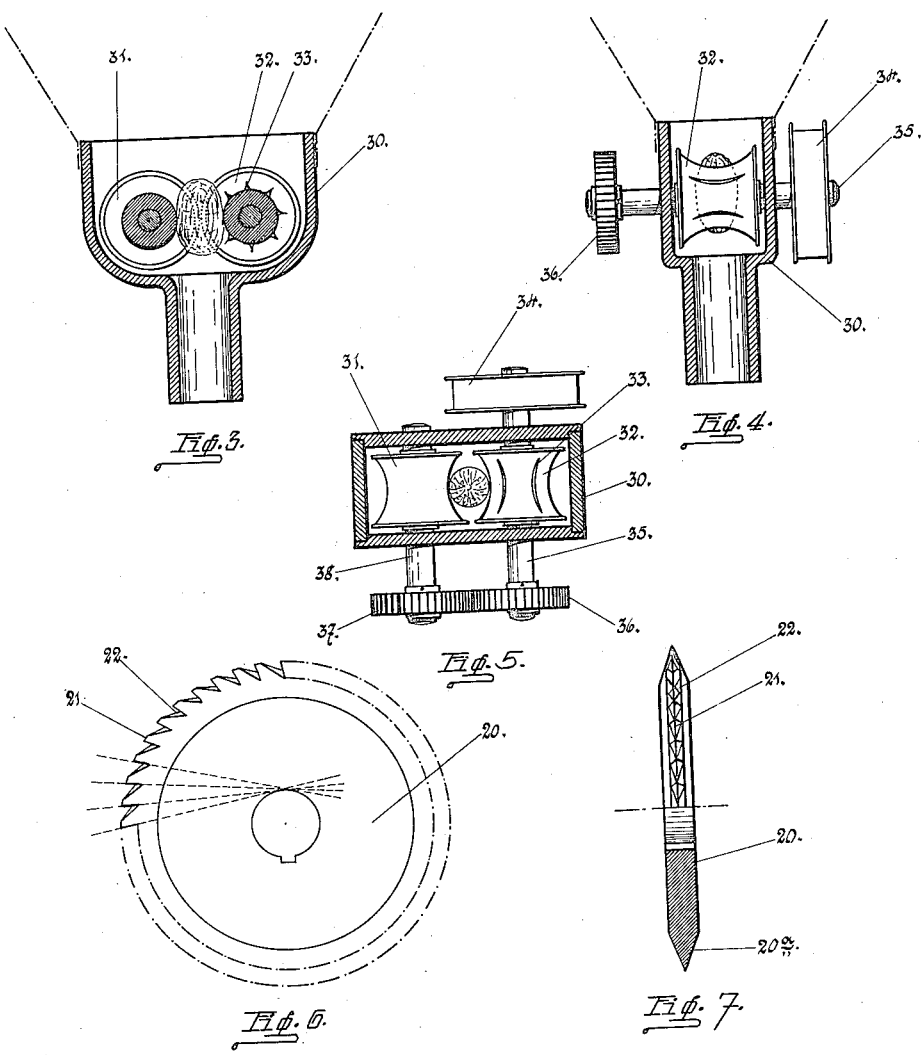

UNITED STATES PATENT OFFICE.

EDMUND ULLRICH AND EMILIO ALCAYDE ALCAYDE, OF MEXICO, MEXICO.

NUT-BREAKING MACHINE.

1,232,409.
Specification of Letters Patent.
Patented July 3, 1917.

Application filed June 9, 1916. Serial No. 102,790.

*To all whom it may concern:*

Be it known that we, EDMUND ULLRICH, Austrian subject, and EMILIO ALCAYDE ALCAYDE, Spanish subject, both residing at Mexico city, Mexico, have invented a new and useful Nut-Breaking Machine, of which the following is a specification.

This invention relates to a new nut breaking machine which can be used for breaking all kinds of nuts and generally every kind of fruit with a hard shell. Up to the present time there does not exist any suitable machine for this kind of work, as all the known devices crush the shell and thereby injure the fruit which is especially undesirable if the oil contained in the nuts is to be extracted afterward, as during the breaking of the nuts the fruit and the crushed shells are mixed, making a thorough extraction of the oil impossible. After many experiences with our machine we are convinced that our invention prevents all these disadvantages of former devices, as the shells, through the wedge-like form of our cutters, are not crushed but cleanly cut without the fruit being injured in any way.

In the accompanying drawings in which a preferred embodiment of the invention is shown:—

Figure 1 represents a front elevation of a nut breaking machine complete made according to the invention.

Fig. 2 is a top plan view of the same machine without the nut feed hopper.

Fig. 3 is a section taken longitudinally through the hopper, showing the mechanism of the feeding device.

Fig. 4 is a view of the same device from the other side.

Fig. 5 is a top plan view of the feeding device.

Fig. 6 shows the form of the teeth of the circular cutters.

Fig. 7 is a vertical section through one of the cutters.

The same numbers indicate the same parts in all the figures.

The machine consists of an iron or wooden frame 1, on the top of which is fastened a round plate or table 2 which however can have any other shape or form such as square, rectangular, etc. On top of this plate and forming a cross there are provided eight double guides 3 in which by means of the cranks 4 and the screws 5 the sliding pieces 6 can be moved. These sliding pieces have the form of a big U and support the cushions or ball bearings 7.

In order to make the following description more easily understood, the four different parts of the double guides 3 which form the cross, are given in Fig. 3, the different letters A, B, C and D.

In the pair of cushions or ball bearings of part A and in the support 8 rotates the main axle or shaft 9, fitted on one end with pulleys 10 for the transmission of the power which moves the machine. On this shaft 9 and on each side of the sliding piece 7 there is a conical gear wheel 11. These conical gear wheels transmit their movement to the shafts 12 and 13 of the parts B and D by means of other conical wheels 14 and 15. On the opposite end of the shaft 12, part B, there is a conical wheel 16 which moves the shaft 17 of part C through the conical wheel 18. On the shaft 17 and on the end opposed to the wheel 18, a pulley 19 is mounted which moves the feeding device of the hopper.

In the middle of the sliding pieces 6 and each one on its corresponding shaft are four circular angular cutters 20 which rotate toward the center of the plate or table 2. These cutters can be adjusted corresponding to the size of the nuts to be cut, by means of the sliding pieces 6, the screws 5 and the cranks 4. In Figs. 6 and 7 the angular shape of the edge of the cutters is clearly shown, which form is of very great importance as the wedge-like edge $20^a$ at the same time cuts, opens and breaks the shell of the nut without touching the fruit in the inside. There is also shown the shape of the teeth whose edge 21 follows in part the periphery of the cutter, every tooth having a sloping-down wedge-like back 22.

The table or plate 2 has slots 23 forming a cross in which the cutters rotate. In the middle of the plate 2 there is a support 24 fastened on four legs which bears the feeding tube 25 of the nuts. This tube on the inferior end has four vertical openings or slots 26 where the edges of the cutters enter.

On top of the frame 1 there is another frame 27, divided by two beams 28 which support the hopper 29. The bottom of this hopper is provided with a special feeding mechanism shown in Figs. 3, 4 and 5, and which consists in a rectangular box 30 with two rotating spools 31 and 32. These spools have hyperbolic surfaces, and one of the spools is provided with ribs 33 for catching the nuts as they pass between the spools. In order to move these spools, a pulley 34 is mounted on one end of the shaft 35 of one of the spools which pulley in turn is connected with a pulley 19 on one of the cutter shafts. On the other end of the shaft 35 there is a sprocket wheel 36 which moves the other spool through the sprocket wheel 37 fastened at the end of the shaft 38 of the second spool. The two shafts 35 and 38 rotate in the supports 39 fastened to the beams 28.

Our improved nut feeding device by means of spools with hyperbolic surfaces is of very great importance, as only one nut at a time is allowed to fall between the cutting edges. Instead of using spools we may also provide a spiral thread as a feeding mechanism which gives equally good results as it also only lets escape one nut at a time which is, we repeat, of the highest importance for the smooth running of the machine.

It is understood that the embodiment of the invention set forth herein is only one of the many embodiments or forms the invention may take, and we do not wish to be limited in the practice of the invention nor in our claims to the particular embodiment set forth.

What we claim is:—

1. In a nut breaking machine, the combination of a plate or table having thereon a plurality of sliding pieces, bearings formed in said sliding pieces, a number of horizontal shafts or axles mounted one in each of said bearings, said shafts being rotated by means of several gears, and means such as worm-screws for projecting or retracting the sliding pieces to any position desired.

2. In a nut breaking machine, the combination of any number of rotating circular breakers, with wedge-like edges, fastened to horizontal shafts and being positioned opposite to each other, sliding pieces, the said shafts being mounted thereon, and worm-screws for adjusting said sliding pieces toward or from the center of the machine.

3. In a nut breaking machine, a number of rotating circular breakers, sharpened toward their periphery to a wedge-like edge and provided with teeth for taking a hold of the nuts and for conveying them into the machine, such breakers being secured to horizontal shafts and positioned opposite to each other, sliding pieces, the said shaft being mounted in bearings in said sliding pieces, and worm-screws for adjusting said sliding pieces toward or from the center of the machine.

In testimony whereof, we affix our signatures.

EDMUND ULLRICH.
EMILIO ALCAYDE ALCAYDE.